(12) United States Patent
Trzasko et al.

(10) Patent No.: US 8,897,515 B2
(45) Date of Patent: Nov. 25, 2014

(54) METHOD FOR COMPRESSED SENSING IMAGE RECONSTRUCTION USING A PRIORI KNOWLEDGE OF SPATIAL SUPPORT

(75) Inventors: Joshua D Trzasko, Rochester, MN (US); Armando Manduca, Rochester, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 989 days.

(21) Appl. No.: 12/877,638

(22) Filed: Sep. 8, 2010

(65) Prior Publication Data
US 2011/0058719 A1 Mar. 10, 2011

Related U.S. Application Data

(60) Provisional application No. 61/240,416, filed on Sep. 8, 2009.

(51) Int. Cl.
*G06K 9/00* (2006.01)
*G06T 11/00* (2006.01)

(52) U.S. Cl.
CPC ......... *G06T 11/006* (2013.01); *G06T 2211/436* (2013.01); *G06T 2211/424* (2013.01)
USPC .......................................... 382/128; 382/131

(58) Field of Classification Search
USPC ................................. 382/128, 131
See application file for complete search history.

(56) References Cited

U.S. PATENT DOCUMENTS

| 6,941,019 | B1 | 9/2005 | Mitchell et al. | |
|---|---|---|---|---|
| 7,447,382 | B2 * | 11/2008 | Nestares et al. | 382/299 |
| 7,623,727 | B2 * | 11/2009 | Takahashi | 382/272 |
| 8,374,413 | B2 * | 2/2013 | Chen | 382/131 |
| 2008/0175452 | A1 * | 7/2008 | Ye et al. | 382/128 |
| 2009/0161932 | A1 * | 6/2009 | Chen | 382/131 |
| 2011/0286646 | A1 * | 11/2011 | Chen et al. | 382/131 |

OTHER PUBLICATIONS

Chen et al.,"Prior image constrained compressed sensing (PICCS): A method to accurately reconstruct dynamic CT images from highly undersampled projection data sets", Jan. 2008, pp. 660-663, Med Medical Physics, vol. 35, No. 2.*
Donoho, "Compressed sensing," IEEE Trans. Inf. Theory 52, 1289-1306, published 2006.*

(Continued)

*Primary Examiner* — Wesley Tucker
(74) *Attorney, Agent, or Firm* — Quarles & Brady, LLP

(57) ABSTRACT

A method for image reconstruction that utilizes the benefits of compressed sensing ("CS") while incorporating a priori knowledge of object spatial support into the image reconstruction is provided. Image data is acquired from a subject, for example, with a medical imaging system, such as a magnetic resonance imaging ("MRI") system or a computed tomography ("CT") system. An estimate of the spatial support of the subject is produced, for example, using a low resolution image of the subject, or an image reconstructed from undersampled image data in a traditional sense. An estimate image of the subject is also produced by using traditional image reconstruction methods on the acquired image data. An image of the subject is then reconstructed using the produced estimate image and produced spatial support estimate. This method allows for the reconstruction of quality images from undersampled image data in a computationally efficient manner.

12 Claims, 3 Drawing Sheets

(56) References Cited

OTHER PUBLICATIONS

Block, K., et al., Undersampled Radial MRI with Multiple Coils. Iterative Image Reconstruction Using a Total Variation Constraint, Magn. Reson. Med. 57:1086-1098, 2007.

Caire, G., et al., Impulse Noise Cancellation in OFDM: An Application of Compressed Sensing, ISIT 2008, Toronto, Canada, Jul. 6-11, 2008, pp. 1293-1297.

Candes, E., et al., Robust Uncertainty Principles: Exact Signal Reconstruction from Highly Incomplete Frequency Information, Jun. 10, 2004, arXiv:math/0409186v1, pp. 1-39.

Candes, E., et al., Enhancing Sparsity by Reweighted l1 Minimization, Oct. 2007, arXiv:0711.1612v1, pp. 1-28.

Chartrand, R., Exact Reconstruction of Sparse Signals Via Nonconvex Minimization, IEEE Signal Processing Letters 14(10):707-710, 2007.

Donoho, D., Compressed Sensing, IEEE Transactions on Information Theory, vol. 52, No. 4, Apr. 2006, pp. 1289-1306.

Lustig, M., et al., Compressed Sensing MRI, IEEE Signal Processing Magazine, Mar. 2008, pp. 72-82.

Lustig, M., et al., Sparse MRI: The Application of Compressed Sensing for Rapid MR Imaging, Magn. Reson. Med. 58:1182-1195, 2007.

Mistretta, C., et al., Highly Constrained Backprojection for Time-Resolved MRI, Magn. Reson. Med. 55(1):30-40, 2006.

Natarajan, B., Sparse Approximate Solutions to Linear Systems, SIAM J. Comput. 24(2):227-234, 1995.

Sharma, S., et al., Region of Interest Compressed Sensing, Proc. of the ISMRM Workshop on Data Sampling and Image Reconstruction, Jan. 2009.

Trzasko, J., et al., Highly Undersampled Magnetic Resonance Image Reconstruction Via Homotopic L0-Minimization, IEEE Trans. Medical Imaging 28(1):106-121, 2009.

Ye, J., et al., Projection Reconstruction MR Imaging Using FOCUSS, Magn. Reson. Med. 57:764-775, 2007.

\* cited by examiner

METHOD FOR COMPRESSED SENSING IMAGE RECONSTRUCTION USING A PRIORI KNOWLEDGE OF SPATIAL SUPPORT

CROSS-REFERENCE TO RELATED APPLICATIONS

This application claims the benefit of U.S. Provisional Patent Application Ser. No. 61/240,416 filed on Sep. 8, 2009, and entitled "Method for Compressed Sensing Image Reconstruction Using A Priori Knowledge of Spatial Support."

FIELD OF THE INVENTION

The field of the invention is medical imaging and, more particularly, methods for reconstructing images from acquired image data.

BACKGROUND OF THE INVENTION

According to standard image reconstruction theories, in order to reconstruct an image without aliasing artifacts, the sampling rate employed to acquire image data must satisfy the so-called Nyquist criterion, which is set forth in the Nyquist-Shannon sampling theorem. Moreover, in standard image reconstruction theories, no specific prior information about the image is needed. On the other hand, when some prior information about the desired or target image is available and appropriately incorporated into the image reconstruction procedure, an image can be accurately reconstructed even if the Nyquist criterion is violated. For example, if one knows that a desired target image consists of only a single point, then only two orthogonal projections that intersect at that point are needed to accurately reconstruct the image point.

If prior information is known about the desired target image, such as if the desired target image is a set of sparsely distributed points, it can be reconstructed from a set of data that was acquired in a manner that does not satisfy the Nyquist criterion. Put more generally, knowledge about the sparsity of the desired target image can be employed to relax the Nyquist criterion; however, it is a highly nontrivial task to generalize these arguments to formulate a rigorous image reconstruction theory.

The Nyquist criterion serves as one of the paramount foundations of the field of information science. However, it also plays a pivotal role in modern medical imaging modalities such as magnetic resonance imaging ("MRI") and x-ray computed tomography ("CT"). When the number of data samples acquired by an imaging system is less than the requirement imposed by the Nyquist criterion, artifacts appear in the reconstructed images. In general, such image artifacts include aliasing and streaking artifacts. In practice, the Nyquist criterion is often violated, whether intentionally or through unavoidable circumstances. For example, in order to shorten the data acquisition time in a time-resolved MR angiography study, image data is often acquired using a radial sampling pattern that undersamples the peripheral portions of k-space.

Recently, a new mathematical framework for image reconstruction termed "compressed sensing" (CS) was formulated. In compressed sensing, only a small set of linear projections of a sparse image are required to reconstruct a quality image. The theory of CS is described by E. Candès, J. Romberg, and T. Tao, in "Robust uncertainty principles: Exact Signal Reconstruction from Highly Incomplete Frequency Information," IEEE Transactions on Information Theory 2006; 52:489-509, and by D. Donoho in "Compressed Sensing," IEEE Transactions on Information Theory 2006; 52:1289-1306, and is disclosed, for example, in U.S. Pat. No. 7,646,924.

The work of Candès, et al., and Donoho produced both exact and approximate recovery sampling conditions for convex functionals, albeit with a higher sampling constant. In aspiration of reducing sampling requirements closer to the $l_0$-associated theoretical limit, quasi-convex, almost everywhere ("a.e.") differentiable prior functionals, such as $P(v) = \|v\|_p^p$ with $0 < p \leq 1$ have been investigated recently. Such prior functionals more closely resemble the target $l_0$-norm than does the $l_1$-norm. While these methods cannot guarantee numerical achievement of global minima, they consistently outperform analogous convex techniques in practice.

The field of medical imaging can benefit from compressed sensing. In x-ray computed tomography ("CT"), fewer measurements translates to a lower radiation dose received by the patient. Similarly, in magnetic resonance imaging ("MRI"), decreasing the required number of measurements necessary to form an image allows for faster exams, which improves patient comfort and thereby minimizes the likelihood of subject motion. Additionally, clinical throughput is increased which potentially translates to reduced patient costs.

While natural and medical images share many characteristics, differences between the applications do exist and several key features unique to medical imaging have yet to be exploited within CS. In medical imaging, in general, image background is often defined by zero signal. Moreover, the spatial support of objects of interest in medical images is often known a priori or can be easily estimated. For example, in time-resolved HYPR imaging, as described, for example, by C. Mistretta, et al., in "Highly Constrained Backprojection for Time-Resolved MRI," Magnetic Resonance in Medicine, 2006; 55(1):30-40, object support in a single time-frame is a subset of the support of the composite image used in the constrained backprojection operation. Support information could also be estimated from the low-resolution "scout" images typically acquired during pre-scan localization in both MRI and CT.

It would therefore be desirable to provide a method for image reconstruction that utilizes the framework of compressed sensing, while allowing a faster, more robust reconstruction process that is closer to an $l_0$-minimization.

SUMMARY OF THE INVENTION

The present invention overcomes the aforementioned drawbacks by providing a method for image reconstruction that utilizes the benefits of compressed sensing ("CS") while incorporating a priori knowledge of object spatial support into the image reconstruction.

It is an aspect of the present invention to provide a method for reconstructing an image of a subject from image data that has been acquired with a medical imaging system, for example, a magnetic resonance imaging ("MRI") system or a computed tomography ("CT") system. The acquired image data is, for example, undersampled image data, such as a k-space data set in which only every other k-space line is sampled, or a k-space data set in which a set of radial projections are sampled, such that a peripheral portion of k-space is angularly undersampled. An estimate of the spatial support of the subject is produced, for example, using a low resolution image of the subject, or an image reconstructed from the undersampled image data in a traditional sense. An estimate image of the subject is also produced, for example, by using traditional image reconstruction methods on the undersampled image data. An image of the subject is then reconstructed using the produced estimate image and produced spatial support estimate. A compressed sensing framework is employed when performing the reconstruction.

It is another aspect of the invention to provide a method for reconstructing an image of a subject using information about the spatial support of the subject. A matrix is produced, which penalizes locations in an estimate image of the subject for lying outside of an estimated spatial support of the subject. For example, a diagonal matrix is formed, in which its diagonal entries are assigned a value of zero for corresponding spatial locations in the estimate image matrix that are elements of the estimated spatial support. Moreover, the diagonal entries are assigned a value different than zero, such as one, when corresponding spatial locations in the estimate image matrix are not elements of the spatial support.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION OF THE INVENTION

Figure 1:
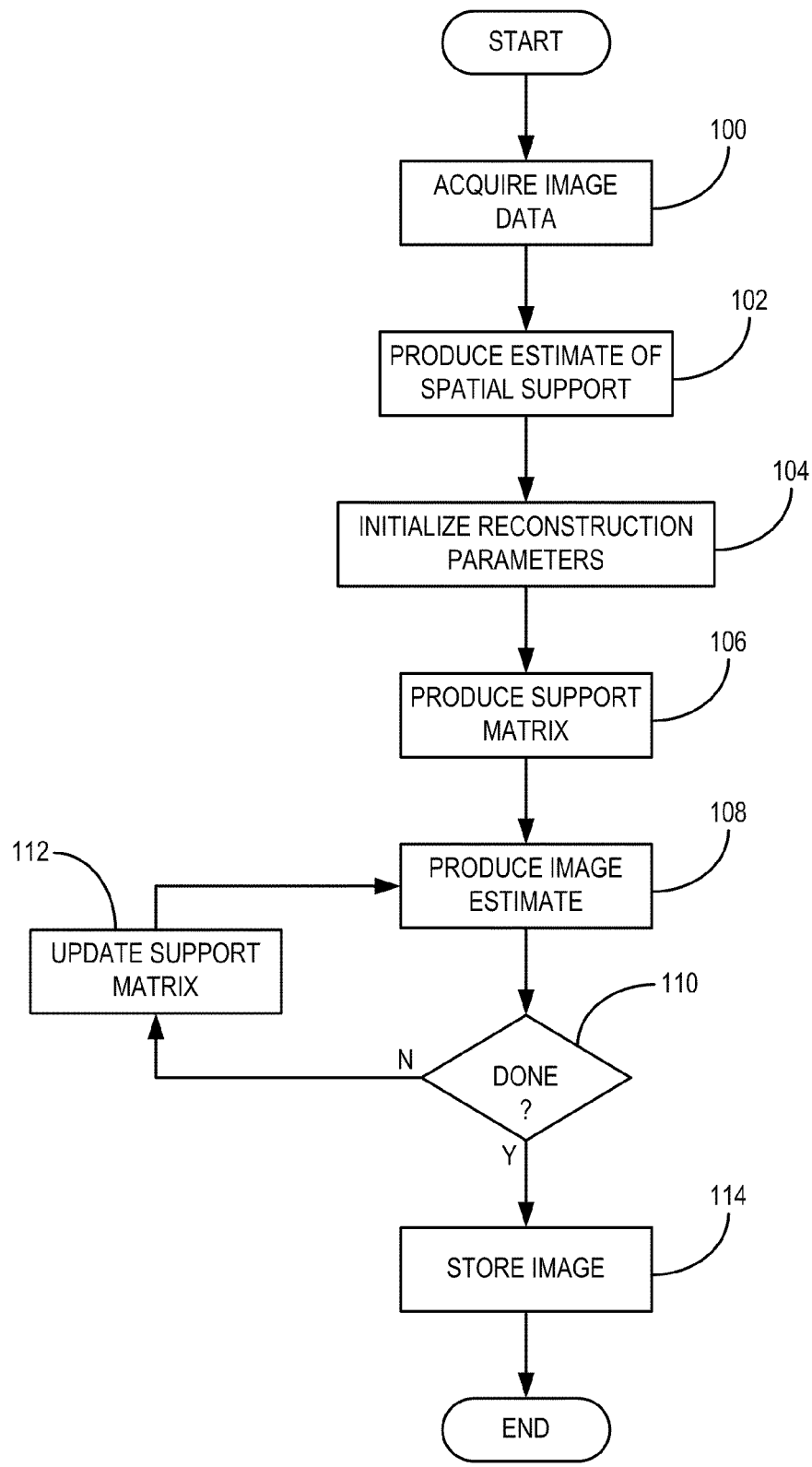
FIG. 1 is a flowchart setting forth the steps of an exemplary image reconstruction method that utilizes a priori information about the spatial support of an underlying subject being imaged.

A common problem of image reconstruction techniques is how to most accurately estimate a discrete approximation of an image from the underlying observed measurements. If $\Phi$ denotes a linear sensing operator, such as a partial discrete Fourier Transform ("DFT") matrix common in magnetic resonance imaging, this estimation problem becomes recovering a discrete signal, s, from a corrupted measurement vector:

$$f = \Phi s + n \quad (1);$$

where n represents the statistics of a noise process and f. Additionally, generic a priori knowledge about the signal class of which s is a member may be considered. It can be assumed that n is drawn from an independent and identically distributed ("i.i.d.") Gaussian processes.

Given Eqn. (1), the maximum likelihood ("ML") estimator of s is given by the solution to the ordinary least squares ("OLS") problem:

$$u_{ML} = \operatorname*{argmin}_u \|\Phi u - f\|_2^2 = (\Phi^*\Phi)^{-1}\Phi^* f; \quad (2)$$

where u is a desired estimate of the discrete signal, s. Note that the uniqueness of $u_{ML}$ is only guaranteed if $\Phi$ is full rank. In fact, even if $\Phi$ is full rank, it may very well be ill-conditioned. To counter potential ill-posedness, the OLS problem is often stabilized by imposing constraints based on a priori knowledge or assumptions about s.

Sparsity is perhaps the most powerful form of a priori knowledge. An image, s, is said to be sparse if, given some "sparsifying" transform, $\Psi$, such as a wavelet or spatial gradient transform, $S \ll |\Omega|$, where $S = \operatorname{supp}(\Psi s)$ and $\Omega = \operatorname{dom}(s)$. Given a limited set of potentially noisy measurements, the search for the sparsest image possessing a prescribed degree of fidelity to the measurement set is defined by the $l_0$-minimization problem:

$$\min_u \|\Psi u\|_0 \quad \text{s.t.} \quad \|\Phi u - f\|_2^2 \leq \varepsilon^2; \quad (3)$$

where $\varepsilon^2$ is the variance of the noise n, and $\|v\|_0$ indicates the $l_0$-norm of a vector v, and has the form:

$$\|v\|_0 = \sum_{x \in \Omega} 1(|v(x)| > 0). \quad (4)$$

Thus, the $l_0$-norm of a vector v essentially is a count of the non-zero terms in the vector, v.

It has recently been shown that, for the specific case of Eqn. (3) with $\Psi = I$ and $\varepsilon = 0$, only $O(S \log(|\Omega|))$ random samples are necessary to guarantee with significant probability that the solution of Eqn. (3) is exactly s. While these sampling conditions are theoretically alluring, Eqn. (3) requisites combinatorial optimization (Eqn. (3) is, technically speaking, NP-hard) and, thus, is of little practical use in modern imaging.

Consider the following generalization of Eqn. (3):

$$\min_u P(\Psi u) \quad \text{s.t.} \quad \|\Phi u - f\|_2^2 \leq \varepsilon^2; \quad (5)$$

where P( . . . ) is a separable metric prior functional. Compressed sensing produces both exact and approximate recovery sampling conditions for $P(v) = \|v\|_1$, a convex functional, similar to those associated with Eqn. (3), albeit with a higher sampling constant. This area of study is now known as compressed, or compressive, sensing ("CS"). In aspiration of reducing sampling requirements closer to the $l_0$-associated theoretical limit, quasi-convex, almost everywhere ("a.e.") differentiable prior functionals, such as $P(v) = \|v\|_p^p$ with $0 < p \leq 1$ have been investigated recently. Such prior functionals more closely resemble the target $l_0$-norm than does $l_1$. While these methods cannot guarantee numerical achievement of global minima, they consistently outperform analogous convex techniques in practice.

Described herein is a method for image reconstruction that utilizes a priori information about the spatial support of the underlying imaged object in a compressed sensing-based reconstruction. Such a reconstruction method is robust with respect to inaccuracies in the estimated object support. While not universally applicable in imaging, object spatial support is often known a priori or can be easily estimated in many medical imaging applications. If the spatial support can be learned or estimated prior to performing undersampled reconstruction, the reconstruction process can significantly benefit from exploiting this information.

Defining $\Omega_0$ as the estimated support of the underlying image, it can be observed that this is the support of the object itself, and not of the coefficients of its transform representation. Given this introduced constraint on spatial support, Eqn. (3) can be augmented to:

$$\min_u \|\Psi u\|_0 \text{ s.t. } \begin{cases} \|\Phi u - f\|_2^2 \le \varepsilon^2 \\ supp(u) \subseteq \Omega_0. \end{cases} \quad (6)$$

Equivalently, Eqn. (6) can be defined as:

$$\min_u \|\Psi u\|_0 \text{ s.t. } \begin{cases} \|\Phi u - f\|_2^2 \le \varepsilon^2 \\ \|Wu\|_0 = 0; \end{cases} \quad (7)$$

where the diagonal matrix, W, is given by:

$$W_{x,x} = \begin{cases} 0, & x \in \Omega_0 \\ 1, & x \in \Omega \backslash \Omega_0. \end{cases} \quad (8)$$

That is, for each spatial location, x, in the desired signal estimate, u, if that spatial location, x, is located within the spatial support, $\Omega_0$, then the corresponding diagonal entry at (x,x) in the matrix, W, receives a value of zero. However, if the spatial location, x, lies on the set difference between the domain, $\Omega$, of the desired signal estimate, u, then the corresponding diagonal entry at (x,x) in the matrix, W, receives a value of one. Here, the domain, $\Omega$, of the desired signal estimate, u, is equivalent to the field-of-view of the image, and the set difference, $\Omega \backslash \Omega_0$, is equal to those spatial location within the field of view that are not associated with the spatial support of the object. For example, the set difference, $\Omega \backslash \Omega_0$, includes the "background" locations outside of the subject being imaged, but still within the field-of-view. In effect, Eqn. (6) rewards a solution, u, for residing on $\Omega_0$, whereas Eqn. (7) penalizes u for residing on $\Omega \backslash \Omega_0$. However, despite the similar effect of these approaches, Eqn. (7) is more manageable from an optimization standpoint.

As discussed above, strictly $l_0$-based problem formulations are theoretically optimal, but of little practical use. In standard CS, the challenging $l_0$-norm term is relaxed to either a convex or a quasi-convex form, as demonstrated above in Eqns. (3) and (5). Analogously, Eqn. (7) can be relaxed to:

$$\min_u P_1(\Psi u) \text{ s.t. } \begin{cases} \|\Phi u - f\|_2^2 \le \varepsilon^2 \\ P_2(Wu) = 0; \end{cases} \quad (9)$$

where $P_1(\dots)$ and $P_2(\dots)$ represent similar relaxations of the $l_0$-norm. While distinct functionals can be used, by way of example, the case where $P(\dots) = P_1(\dots) = P_2(\dots)$ is described herein. However, in the succeeding description, the appropriate substitution of distinct functionals for $P(\dots)$ is possible.

Unconstrained optimization problems are typically much easier to handle than their constrained analogs and thus are commonly employed in practice. By way of example, the Lagrangian of Eqn. (9) is given by:

$$\min_u \left\{ P(\Psi u) + \frac{\lambda}{2} \|\Phi u + f\|_2^2 + \gamma P(Wu) \right\}; \quad (10)$$

where there exist non-negative regularization parameters, $\lambda$ and $\gamma$, such that the solutions of Eqns. (9) and (10) are substantially close. Particularly, if $P(\dots)$ is convex, the existence of $\lambda$ and $\gamma$ such that solutions of Eqns. (9) and (10) are substantially close is guaranteed. While a search for optimal regularization parameters is possible, they are often simply treated as user-assigned free parameters.

Denoting the adjoint of a matrix, A, as A*, and following Brandwood's convention, the (weak) complex gradient of the energy functional in Eqn. (10) with respect to u is given by:

$$L(u) = \Psi^* \Lambda(\Psi u) \Psi u + \lambda \Phi^*(\Psi u - f) + \gamma W^* \Lambda^*(Wu) Wu \quad (11);$$

where for an arbitrary matrix, A, the weighting matrix, $\Lambda$, is given by:

$$\Lambda(Au)_{x,x} = \frac{1}{Au(x)} \cdot \frac{dP(Au(x))}{dAu(x)}. \quad (12)$$

As discussed above, the use of distinct functionals, $P_1(\dots)$ and $P_2(\dots)$, is possible. In this situation, Eqn. (11) would contain two similarly distinct weighting matrices, $\Lambda_1(\dots)$ and $\Lambda_2(\dots)$. Stationary points of Eqn. (11) are readily found as elements of the kernel of Eqn. (11). Kernel elements are globally optimal when $P(\dots)$ is convex, but locally-optimal when $P(\dots)$ is quasi-convex.

To identify u satisfying $L(u)=0$, an inexact quasi-Newton method is employed. Recalling the standard Newton iteration:

$$u_{t+1} = u_t - H^{-1}(u_t) L(u_t) \quad (13);$$

where $H(u_1)$ is the complex Hessian of the energy functional in Eqn. (10), this iteration is considered inexact when the Hessian is only partially inverted, such as via truncated conjugate gradient ("CG") iteration. From Eqn. (11):

$$H(u) = \Psi^*[\Lambda(\Psi u) + \Lambda'(\Psi u)]\Psi + \lambda\Phi^*\Phi + \gamma W^*[\Lambda(Wu) + \Lambda'(Wu)]W; \quad (14)$$

where $$\Lambda'(Au)_{x,x} = Au(x) \cdot \frac{d\Lambda(Au)_{x,x}}{dAu(x)}. \quad (15)$$

As $P(\dots)$ is generally non-smooth at the origin, the second order term in Eqn. (14) is not well-defined. The instability in the Hessian can be eliminated, however, by considering a linear approximation of Eqn. (14); namely:

$$\tilde{H}(u) = \Psi^*\Lambda(\Psi u)\Psi + \lambda\Psi^*\Psi + \gamma W^*\Lambda(Wu)W \quad (16).$$

While this action limits the theoretical convergence of the algorithm to be linear, it nonetheless performs well in practice. It will be appreciated by those skilled in the art that different minimization methods other than a quasi-Newton method can readily be applied to estimate the desired signal, u, from Eqn. (9) above. Moreover, it should be appreciated by those skilled in the art that while the linear approximation of the Hessian presented in Eqn. (16) provides for a more computationally efficient solution to the quasi-Newton method, other, more complex approaches can be employed.

Referring now to FIG. 1, a flowchart setting forth the steps of an exemplary image reconstruction method that utilizes a priori information regarding the spatial support of the underlying image object in a compressed sensing framework is provided. First, image data is acquired from a subject with an imaging system, as indicated at step 100. Exemplary imaging systems include magnetic resonance imaging ("MRI") systems and x-ray computed tomography ("CT") imaging systems; however, other imaging systems may also include different medical imaging systems and optical imaging systems. An undersampled data acquisition scheme is employed in order to decrease the amount of time required to acquire the image data. For example, only every other line in k-space is sampled when using an MRI system. By way of another example, a series of radial projections in k-space may be sampled, such that the peripheral regions of k-space are angularly undersampled. Similar radial undersampling schemes can be employed for CT imaging applications. After the image data has been acquired, an estimate of the spatial support of the subject being imaged is produced next, as indicated at step 102.

Figure 2A:
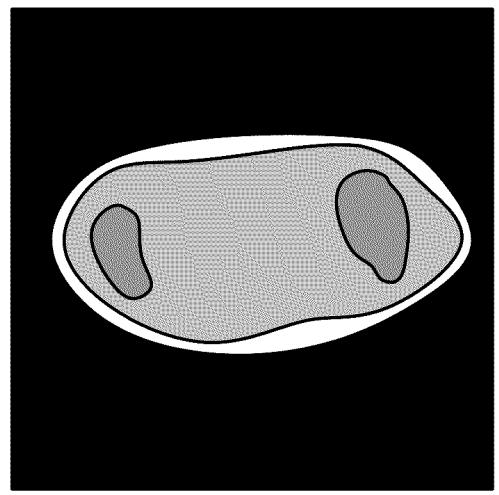
FIG. 2A is a pictorial representation of an exemplary medical image of a subject.
Figure 2B:
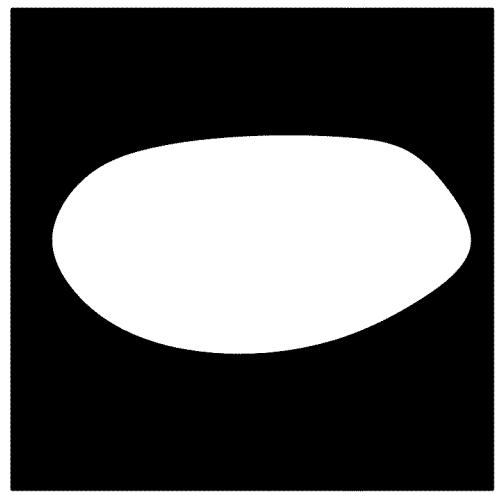
FIG. 2B is a pictorial representation of an exemplary binary image produced from the medical image of FIG. 2A, the binary image depicting the spatial support of the subject.

By way of example, and referring to FIGS. 2A and 2B, an estimate of the spatial support is produced from a separately acquired set of so-called "scout scan" image data. Often times, a scout scan is performed in MRI to determine the spatial location of the subject being imaged with respect to their location within the bore of the MRI system. Images reconstructed from the scout scan image data are of very low resolution, as only the general location of the subject is of concern. A graphic depiction of an exemplary scout image is provided in FIG. 2A. These scout scan images are binarized using a thresholding technique, such that substantially all pixel locations corresponding to the subject in the scout scan image are assigned a binary value of one, and substantially all pixel locations not corresponding to the subject in the scout scan image are assigned a binary value of zero. A graphic depiction of an exemplary binarized scout image, such as the scout image provided in FIG. 2A, is provided in FIG. 2B.

In the foregoing manner, an estimate of the spatial support of the subject is produced, whereby binary values of one correspond to the spatial support of the subject. In the alternative, other methods can be employed for producing an estimate of the spatial support of a subject. For example, when acquiring a time series of image data, the separate time frames in that series can be combined to form a composite image data set. From this composite image data set, a composite image is reconstructed and binarized as detailed above.

After an estimate of the spatial support of the subject is produced, a set of so-called "reconstruction parameters" is initialized, as indicated at step 104. Such reconstruction parameters include the regularization parameters, $\gamma$ and $\lambda$, in Eqn. (11), the choice of prior functional, P(...), in Eqn. (11), and the choice of sparsifying transform, $\Psi$, in Eqn. (11). For example, the regularization parameter, $\gamma$, may be selected from the range 0.1-10, and the regularization parameter, $\lambda$, may be selected from the range 1-10,000. Of course, it will be appreciated by those skilled in the art that any values can be selected for the regularization parameters, $\lambda$ and $\gamma$, where the relationship between the two values is selected to balance a trade-off between enforcing spatial support on the estimated signal, u, and weighting consistency between the measured image data and the estimated signal, u, respectively. Exemplary choices of prior functionals, P(...), include an $l_p$-norm, where $0 < p \leq 1$, and ln $$\left(\frac{|\ldots|}{\sigma} + 1\right),$$

where $\sigma = 0.1$. An exemplary choice of sparsifying transform, $\Psi$, includes a conjugate gradient, a finite difference, a Haar wavelet, and a Cohen-Daubechies-Feauveau ("CDF") 9/7 wavelet.

Next, a diagonal "support matrix," W, is produced, as indicated at step 106. Such a matrix is produced in accordance with Eqn. (8), above. Namely, using the spatial support estimate produced in step 102, the support matrix, W is formed by identifying those spatial locations in an estimate of the desired image, u, that are located within the estimated spatial support, and outside of the estimated spatial support. For a first iteration, the estimate of the desired image, u, is selected as an image reconstructed from the acquired image data in the traditional sense using, for example, a Fourier transform reconstruction. Since the acquired image data is undersampled, this first image estimate is plagued with image artifacts; however, it serves as an acceptable first estimate, $u_0$.

Next, an estimate of the desired image, u, is produced, as indicated at step 108. This image estimate may be produced in accordance with a compressed sensing algorithm, for example, Eqn. (13) above. In such an instance, the compressed sensing algorithm related to Eqn. (13) is constrained by the support matrix, W. As used herein, the term "compressed sensing algorithm" refers to those algorithms in which an accurate or exact signal or image is recovered, or reconstructed, by minimizing the sparsity of the signal or image in an appropriate transform domain, generally, by minimizing the number of non-zero coefficients in the transform domain. A determination is then made at decision block 110 as to whether the produced image estimate is acceptable. If not, the support matrix, W, is updated using the produced image estimate, as indicated at step 112, and a new image estimate is produced at step 108. When an acceptable image estimate, u, is produced, this estimate is stored as the reconstructed image, as indicated at step 114.

Figure 3:
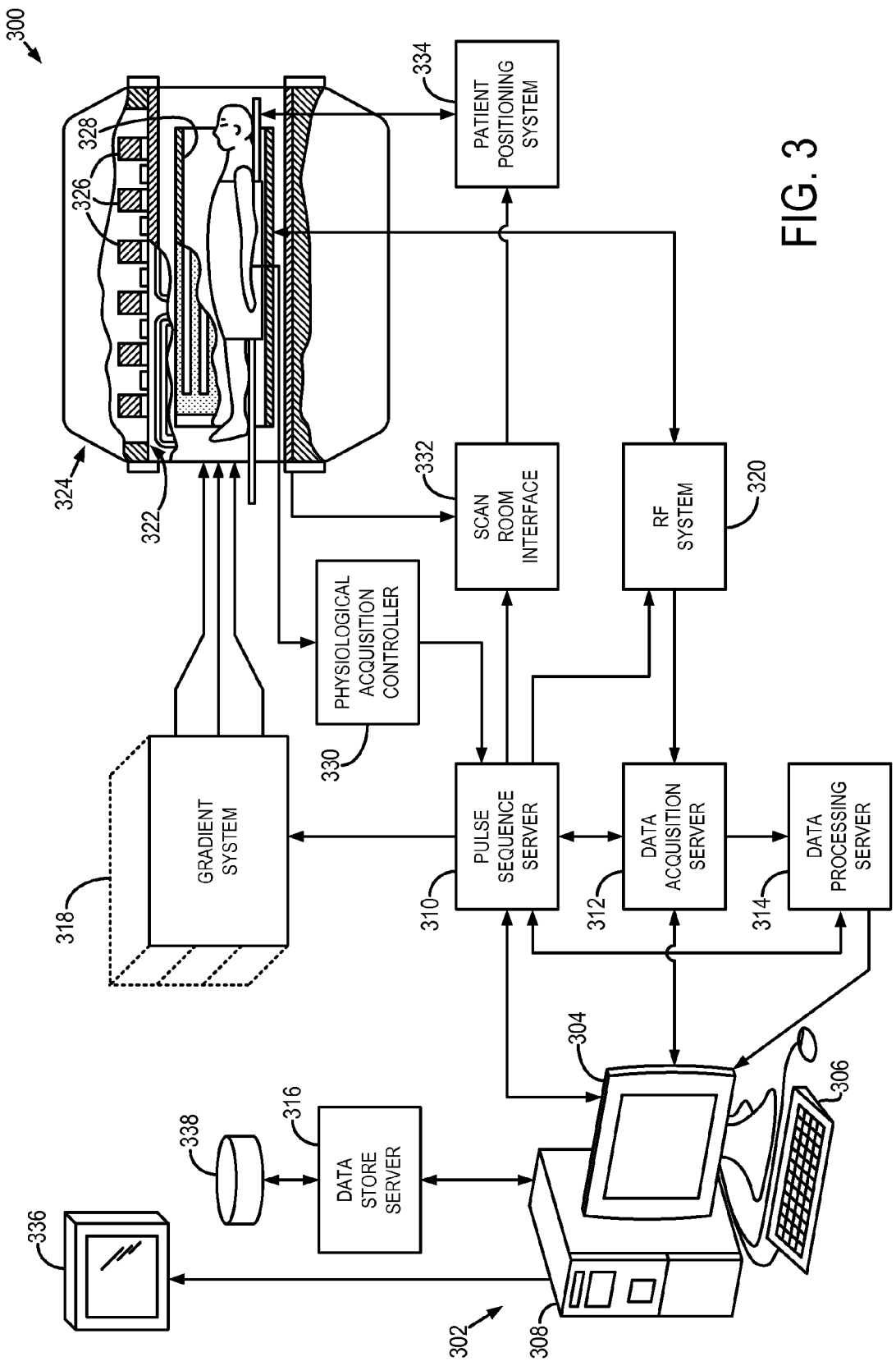
FIG. 3 is a block diagram of an exemplary magnetic resonance imaging ("MRI") system that employs some embodiments of the present invention.

As discussed above, the method of image reconstruction illustrated in FIG. 1 can be implemented in a number of different medical imaging systems. By way of example, an exemplary magnetic resonance imaging ("MRI") system configured to implement this image reconstruction method is illustrated in FIG. 3, to which reference is now made. The MRI system 300 includes a workstation 302 having a display 304 and a keyboard 306. The workstation 302 includes a processor 308, such as a commercially available programmable machine running a commercially available operating system. The workstation 302 provides the operator interface that enables scan prescriptions to be entered into the MRI system 300. The workstation 302 is coupled to four servers: a pulse sequence server 310; a data acquisition server 312; a data processing server 314, and a data store server 316. The workstation 302 and each server 310, 312, 314 and 316 are connected to communicate with each other.

The pulse sequence server 310 functions in response to instructions downloaded from the workstation 302 to operate a gradient system 318 and a radiofrequency ("RF") system 320. Gradient waveforms necessary to perform the prescribed scan are produced and applied to the gradient system 318, which excites gradient coils in an assembly 322 to produce the magnetic field gradients $G_x$, $G_y$, and $G_z$ used for position encoding MR signals. The gradient coil assembly 322 forms part of a magnet assembly 324 that includes a polarizing magnet 326 and a whole-body RF coil 328.

RF excitation waveforms are applied to the RF coil 328, or a separate local coil (not shown in FIG. 3), by the RF system 320 to perform the prescribed magnetic resonance pulse sequence. Responsive MR signals detected by the RF coil 328, or a separate local coil (not shown in FIG. 3), are received by the RF system 320, amplified, demodulated, filtered, and digitized under direction of commands produced by the pulse sequence server 310. The RF system 320 includes an RF transmitter for producing a wide variety of RF pulses used in MR pulse sequences. The RF transmitter is responsive to the scan prescription and direction from the pulse sequence server 310 to produce RF pulses of the desired frequency, phase, and pulse amplitude waveform. The generated RF pulses may be applied to the whole body RF coil 328 or to one or more local coils or coil arrays (not shown in FIG. 3).

The RF system 320 also includes one or more RF receiver channels. Each RF receiver channel includes an RF amplifier that amplifies the MR signal received by the coil 328 to which it is connected, and a detector that detects and digitizes the I and Q quadrature components of the received MR signal. The magnitude of the received MR signal may thus be determined at any sampled point by the square root of the sum of the squares of the I and Q components:

$$M = \sqrt{I^2 + Q^2} \qquad \text{Eqn. (17);}$$

and the phase of the received MR signal may also be determined:

$$\phi = \tan^{-1}\left(\frac{Q}{I}\right). \qquad \text{Eqn. (18)}$$

The pulse sequence server 310 also optionally receives patient data from a physiological acquisition controller 330. The controller 330 receives signals from a number of different sensors connected to the patient, such as electrocardiograph ("ECG") signals from electrodes, or respiratory signals from a bellows or other respiratory monitoring device. Such signals are typically used by the pulse sequence server 310 to synchronize, or "gate," the performance of the scan with the subject's heart beat or respiration.

The pulse sequence server 310 also connects to a scan room interface circuit 332 that receives signals from various sensors associated with the condition of the patient and the magnet system. It is also through the scan room interface circuit 332 that a patient positioning system 334 receives commands to move the patient to desired positions during the scan.

The digitized MR signal samples produced by the RF system 320 are received by the data acquisition server 312. The data acquisition server 312 operates in response to instructions downloaded from the workstation 302 to receive the real-time MR data and provide buffer storage, such that no data is lost by data overrun. In some scans, the data acquisition server 312 does little more than pass the acquired MR data to the data processor server 314. However, in scans that require information derived from acquired MR data to control the further performance of the scan, the data acquisition server 312 is programmed to produce such information and convey it to the pulse sequence server 310. For example, during prescans, MR data is acquired and used to calibrate the pulse sequence performed by the pulse sequence server 310. Also, navigator signals may be acquired during a scan and used to adjust the operating parameters of the RF system 320 or the gradient system 318, or to control the view order in which k-space is sampled. The data acquisition server 312 may also be employed to process MR signals used to detect the arrival of contrast agent in a magnetic resonance angiography ("MRA") scan. In all these examples, the data acquisition server 312 acquires MR data and processes it in real-time to produce information that is used to control the scan.

The data processing server 314 receives MR data from the data acquisition server 312 and processes it in accordance with instructions downloaded from the workstation 302. Such processing may include, for example: Fourier transformation of raw k-space MR data to produce two or three-dimensional images; the application of filters to a reconstructed image; the performance of a backprojection image reconstruction of acquired MR data; the generation of functional MR images; and the calculation of motion or flow images.

Images reconstructed by the data processing server 314 are conveyed back to the workstation 302 where they are stored. Real-time images are stored in a data base memory cache (not shown in FIG. 3), from which they may be output to operator display 312 or a display 336 that is located near the magnet assembly 324 for use by attending physicians. Batch mode images or selected real time images are stored in a host database on disc storage 338. When such images have been reconstructed and transferred to storage, the data processing server 314 notifies the data store server 316 on the workstation 302. The workstation 302 may be used by an operator to archive the images, produce films, or send the images via a network to other facilities.

The present invention has been described in terms of one or more preferred embodiments, and it should be appreciated that many equivalents, alternatives, variations, and modifications, aside from those expressly stated, are possible and within the scope of the invention.

The invention claimed is:

1. A method for reconstructing an image of a subject from image data acquired with a medical imaging system, the steps comprising:
    a) acquiring, with the medical imaging system, image data from the subject;
    b) producing an estimate of a spatial support of the subject;
    c) producing an estimate image of the subject; and
    d) reconstructing an image of the subject using the produced estimate of the spatial support of the subject, the produced estimate image, and a compressed sensing algorithm;
    wherein the produced estimate of the spatial support of the subject is used in step d) by forming a matrix that when applied to the estimate image reduces a contribution of each pixel in the estimate image to the reconstructed image when that pixel is associated with a spatial location lying outside of the spatial support.

2. The method as recited in claim 1 in which the matrix is a diagonal matrix and the diagonal matrix entries have a value of zero for corresponding spatial locations in the estimate image that are elements of the spatial support and a value different than zero for corresponding spatial locations in the estimate image that are not elements of the spatial support.

3. The method as recited in claim 2 in which the value different than zero is a value of one.

4. The method as recited in claim 1 in which step b) includes:
    b)i) acquiring, with the medical imaging system, additional image data from the subject;
    b)ii) reconstructing an additional image of the subject from the acquired additional image data; and
    b)iii) identifying pixels in the reconstructed additional image that are associated with the subject.

5. The method as recited in claim 4 in which step b)iii) further includes producing a binary image by assigning the identified pixels a value of one and other pixels a value of zero.

6. The method as recited in claim 4 in which step b)iii) includes thresholding the reconstructed additional image.

7. The method as recited in claim 1 in which step b) includes identifying pixels in the estimate image produced in step c) that are associated with the subject.

8. The method as recited in claim 7 in which step b) further includes producing a binary image by assigning the identified pixels a value of one and other pixels a value of zero.

9. The method as recited in claim 7 in which step b) includes thresholding the produced estimate image.

10. The method as recited in claim 1 in which step d) includes performing an iterative reconstruction in which the estimate image is updated using the compressed sensing algorithm.

11. The method as recited in claim 10 in which the compressed sensing algorithm is constrained by the estimate of the spatial support of the subject.

12. The method as recited in claim 1 in which the medical imaging system is at least one of a magnetic resonance imaging (MRI) system, an x-ray imaging system, and an x-ray computed tomography (CT) system.

* * * * *